Jan. 12, 1932.  E. S. RUSH  1,841,059

ART OF GAS DISTRIBUTION

Filed July 8, 1924

Inventor
Earl S. Rush
By His Attorney
Edmund G. Borden

Patented Jan. 12, 1932

1,841,059

UNITED STATES PATENT OFFICE

EARL S. RUSH, OF BARTLESVILLE, OKLAHOMA, ASSIGNOR TO DOHERTY RESEARCH COMPANY, OF NEW YORK, N. Y., A CORPORATION OF DELAWARE

ART OF GAS DISTRIBUTION

Application filed July 8, 1924. Serial No. 724,917.

The present invention relates to the art of gas distribution.

The sale of gas under what is commonly known as the "three-part rate" is now being quite widely used in this country. The three-part rate is based upon three distinct charges, namely, a service charge for maintaining service, reading meters, rendering bills, etc.; a demand charge based upon the actual amount of gas which may be delivered to the customer in a unit time; and the actual metered volume of gas delivered to the customer. In the use of the three-part rate the gas distributing system must include a demand limiting meter and a volume meter. In addition to these meters a pressure regulator is generally used in order to give good service to the customer. The arrangement and sequence of these three pieces of apparatus may seriously affect the operation and effectiveness of the different pieces of apparatus, and the arrangements may also have a distinct effect on the character of the gas service of the customer.

It is one of the objects of the present invention to arrange the pressure regulator, the volume meter and a flow limiting device in series in such a way that better average conditions are maintained at the consumer's burners than has hitherto been the case under varying conditions of pressure in the line and consumption at the burners.

A second object of the invention is to provide an arrangement of flow limiting device, pressure regulator and volume meter which will permit each one of these pieces of apparatus to operate to the best advantage while giving efficient gas service to a customer.

A third object of the present invention is to provide a design whereby the pressure regulator and flow limiting device may be combined with the ordinary volume meter in a simple rugged and efficient structure.

Another object of the present invention is to provide a combined pressure regulator and flow limiting device having high efficiency in maintaining constant outlet pressures for flows below the maximum and maintaining an even supply of gas after the maximum has been reached.

A further object of the present invention is to provide a structure containing a combined pressure regulator and flow limiting device capable of use in combination with the ordinary house meter but which may be readily adapted for use separately therefrom when desired.

The present invention, together with further objects and advantages thereof, will be readily understood from the following description taken with the accompanying drawings in which Fig. 1 is an elevation illustrating the arrangement of the combined pressure regulator, volume meter and flow limiting device according to the present invention;

Figure 1:
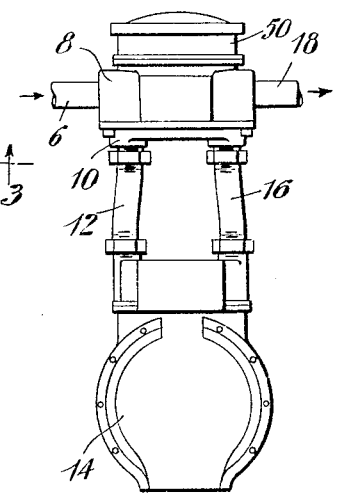

In the drawings 6 is a gas inlet leading into the mid-section 8 of casing of the combined pressure regulator and flow limiting device according to the present invention. From the section 8 gas passes downwardly through a section 10 of said casing and through a pipe 12, Fig. 1, to a volume meter 14. Meter 14 may be of any desired type, a known form of house meter being illustrated. After passing through meter 14 the gas flows out through pipe 16, casing sections 10 and 8 to the outlet pipe 18.

Figure 3:
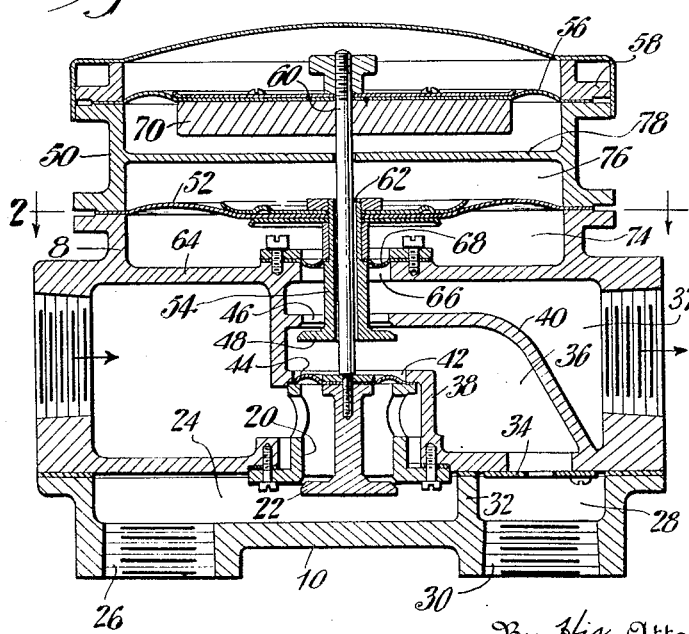
Fig. 3 is a vertical section on the line 3—3 of Fig. 2, the volume meter being omitted.

As shown clearly in Fig. 3, section 8 contains a valve casing 20 providing a seat for a pressure regulating valve 22 at the point where the gas enters the section 10. This section 10 is recessed to provide a chamber 24 from which the gas passes to the pipe 12 previously mentioned through an outlet 26. Section 10 also is recessed to provide a chamber 28 into which gas flows from pipe 16 previously mentioned, through an opening 30. Between chambers 24 and 28 is a web 32. Between sections 8 and 10 and forming one side of chamber 28 is an orifice plate 34 through which gas flows from chamber 28 into an interior chamber 36 formed within the section 8 by two internal webs 38 and 40. Web 38 is apertured as appears at 42 and a diaphragm 44 is stretched across aperture 42 being clamped between the web 38 and valve casing 20 and also fixed to the upper end of valve 22. By this arrangement, the valve 22 is substantially balanced as to gas pressure on opposite sides thereof, since the gas pressure on the lower side of the diaphragm 44 only exceeds the pressure on its upper side by the drop in such pressure through the volume meter 14 and the orifice plate 34. The operation of valve 22 is under the positive control of a weighted diaphragm 56 hereinafter more fully described. The web 40 also is apertured as illustrated at 46 to provide an outlet from the chamber 36. After passing through aperture 46 the gas goes to the outlet pipe 18 which is connected to the consuming devices. Aperture 46 moreover is controlled by the flow limiting valve 48.

Above the section 8 of the casing is a third section 50. Clamped between sections 8 and 50 is a diaphragm 52 connected to the flow limiting valve 48 by means of a hollow stem 54. Diaphragm 52 controls the operation of valve 48. Across the upper end of the section 50 is a second diaphragm 56. The diaphragm 56 is clamped in position by means of a ring 58 and is connected to the pressure regulating valve 22 by a stem or spindle 60 running through the hollow spindle 54, previously mentioned, there being a space 62 between spindles 54 and 60 to provide a passage for gas. It is clear also from Fig. 3 that section 8 has an upper web 64 in which is an aperture 66 through which the stem 54 extends, aperture 66 being closed by a small balancing diaphragm 68 clamped to web 64 and also fixed to stem 54 and acting to prevent gas passing from chamber 74 to outlet chamber 37. Diaphragm 68 thus balances the demand valve 48 as to gas pressure on opposite sides thereof, since the pressure on the upper side of diaphragm 68 only exceeds the pressure on the lower side of the diaphragm by the drop in pressure across orifice 34 and valve 48. It also appears clearly from Fig. 3 that diaphragm 56 is weighted by a member 70 to maintain the normal desired pressure in the outlet pipe 18, it being understood that the upper surface of diaphragm 56 is exposed to the atmosphere.

Figure 2:
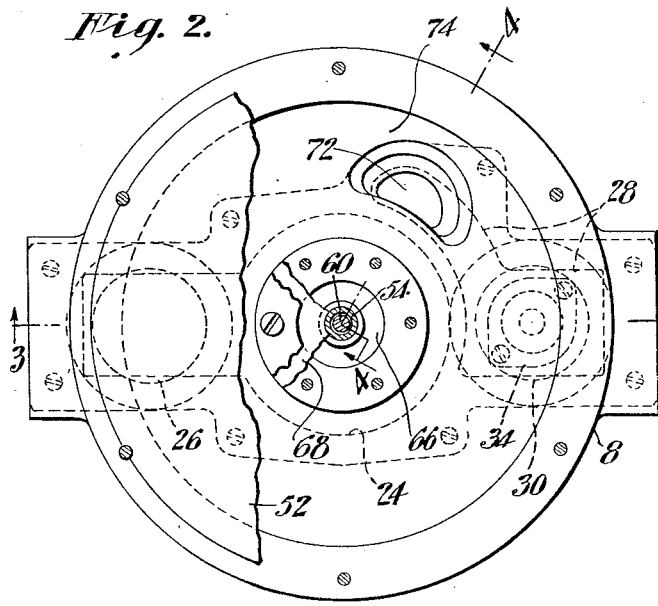
Fig. 2 is a horizontal section of the upper portion of the apparatus illustrated in Fig. 1, Fig. 2 being taken on the line 2—2 of Fig. 3, with some parts being broken away for purposes of illustration.
Figure 4:
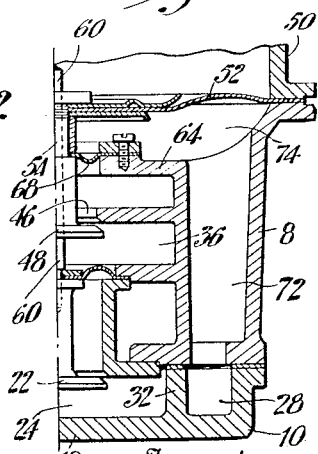
Fig. 4 is a section on the line 4—4 of Fig. 2.

Referring more particularly to Figs. 2 and 4 the chamber 28 on the high pressure side of the orifice plate 34 communicates with a vertical passage 72 in the section 8. The passage 72 communicates with a chamber 74 in the upper part of section 8 and lying between web 64 and diaphragm 52. Thus the gas from the high pressure side of the orifice plate 34 may pass through chamber 28 and passage 72 to the underside of the diaphragm 52. The gas from the chamber 36 on the low pressure side of orifice plate 34 may pass through the hollow stem 54 by means of the space 62 to the chamber 76 lying between the diaphragm 52 and 56. It will be understood in this connection that the web 78 in the middle of chamber 76 has a clearance around the opening through which the spindle 60 passes that permits the equalization of the gas pressures on the opposite sides of the web.

From the foregoing it will be obvious that the pressure regulating valve 22 will be operated by the pressure of gas in chamber 36 acting through diaphragm 56 to maintain a substantially constant pressure in this chamber, the valve 48 being normally inoperative. The chamber 36 being on the discharge side of both the volume meter and the orifice plate while the regulating valve 22 itself is on the high pressure side of both these elements, it is clear that the pressure in chamber 36 and therefore the pressure on the burners (not shown) is quite independent of the drop through the volume meter and the orifice plate, and so is affected to a minimum degree by variations in flow regardless of the demand or flow limit. Variations in inlet pressure of the gas are eliminated in so far as the consuming devices are concerned by valve 22 in a highly efficient manner, the elimination of the effect of such changes from the outlet pressure being facilitated in large measure by the partial balancing of the valve 22 by the diaphragm 44.

As to the operation of the flow limiting valve 48, this valve and the attached diaphragm are made of such weight that the valve stands normally wide open until a certain maximum flow through the apparatus has been attained. At this point in the flow, the drop through the orifice plate 34 becomes sufficient to inaugurate the closing action of the valve. As the lower surface of diaphragm 52 is exposed to the pressure in chamber 28 and the upper side of diaphragm 52 is exposed to the pressure in chamber 36 and these two chambers being on the opposite sides of the orifice plate 34, the valve 48 will be closed just enough to maintain the constant maximum flow through the apparatus this rate of flow being predetermined by the size of the orifice. The flow limiting valve being on the outlet side of both the volume meter and the orifice plate, the pressure of the gas at the outlet of the combined apparatus is quite independent of the drop through the volume meter and the orifice plate, even during the operation of flow limiting valve 48, and the pressure of the gas in the outlet is thus affected during the period in which the flow limiting valve operates by the single flow limiting valve only. The apparatus can therefore supply the maximum amount of gas permitted by valve 48 with a minimum disturbance of the pressure at the consuming devices. Of course, when valve 48 is in operation, the gas pressure in pipe 18 drops off sharply.

The arrangement of the pressure regulator, volume meter and flow limiting device illustrated and described above is very effective in delivering a predetermined amount of gas in a unit time at a constant delivered pressure and measured volume. By the arrangement of this invention the gas is measured at a constantly regulated delivered pressure. The regulation of the pressure of the gas passing through the meter is made in accordance with the pressure on the outlet of the volume meter. Furthermore, the pressure at the inlet of the customer's line is regulated after the gas has passed through all of the instruments which might cause a pressure drop and therefore insures that the customer's pressure up to the maximum volume of gas will be uniform. The arrangement furthermore provides that the regulating valve is in front of or prior to the volume meter and flow limiting device which permits the pressure regulator and volume meter to operate at maximum efficiency and under the most uniform and favorable conditions. Also there are no pockets in which tar or gummy matter in the gas can accumulate, and therefore there is no opportunity for the valves to stick. The pressure regulating valve is connected to a rigid spindle, and the spindle in turn is attached to the weight on the regulating diaphragm so that it is positively operated. The pressure regulating and flow limiting valves operate independently of one another and since the flow limiting valve does not close tightly, it can be made very large and thus adapt the instrument for the measurement of large capacities of gas. Another important feature of the invention lies in the fact that both the pressure regulating and flow limiting valves operate under balanced conditions so that a comparatively low pressure differential is required across the operating diaphragm in order to positively operate the valve.

It will be evident moreover, that in case it is not desired to operate the combined pressure regulator and flow limiting device according to the present invention and as clearly illustrated in Figs. 2 and 3 with a volume meter, that this combined regulator and limiting device may be used separately from the volume meter by merely cutting through the web 32 in the casing section 10 and then plugging the pipe apertures 26 and 30.

Having thus described my invention, I claim:

1. In a combined pressure regulator, volume meter and flow limiting device, the combination of a pressure regulating valve, a volume meter in series with said valve and following the same in the course of the gas flow, and a flow limiting valve in series with said first valve and said volume meter and following said volume meter in the course of the gas flow.

2. In a combined pressure regulator, volume meter and flow limiting device, the combination of a pressure regulating valve, a volume meter in series with said valve and following the same in the direction of the gas flow, a flow limiting valve in series with said first valve, and an orifice plate for said limiting valve, said plate and said flow limiting valve following in series said first valve and said meter in the course of the gas flow.

3. In a combined pressure regulator, volume meter and flow limiting device, the combination of a pressure regulating valve, a volume meter, an orifice plate and a flow limiting valve all arranged in series in the order named in the direction of the gas flow, and means whereby said pressure regulating valve is controlled including means actuated by atmospheric pressure acting against the pressure of the gas following said plate.

4. In a combined pressure regulator, volume meter and flow limiting device, the combination of a pressure regulating valve, a volume meter, an orifice plate and a flow regulating valve all arranged in series in the order named in the course of the gas flow, and means whereby said flow regulating valve is controlled including means actuated by the drop across said plate.

5. In a combined pressure regulator, a volume meter, and flow limiting device, the combination of a pressure regulating valve, a volume meter, an orifice plate, and a flow limiting valve, all arranged in series in the order named in the course of the gas flow, means whereby said regulating valve is controlled by the pressure of the gas following said plate acting against the atmosphere, and means whereby said flow limiting valve is controlled when in operation by the drop across said plate.

6. In a combined pressure regulator and flow limiting device, the combination of a casing having two internal webs forming a central chamber, an orifice plate on the inlet side of said chamber, a pressure regulating valve on the inlet side of said orifice plate, a flow limiting valve on the outlet side of said chamber, and means whereby said pressure regulating valve is controlled by the pressure of the gas between said limiting valve and said plate acting against atmosphere.

7. In a combined pressure regulator and flow limiting device, the combination of means forming a central chamber, an orifice plate on the inlet side of said chamber, a pressure regulating valve on the inlet side of said orifice, a flow limiting valve on the outlet side of said chamber, means whereby said regulating valve is controlled by the pressure of gas between said limiting valve and said plate acting against atmosphere, and means whereby said limiting valve is controlled when operating by the drop across said plate.

8. In a combined pressure regulator and flow limiting device, the combination of means forming a central chamber, a pressure regulating valve on the inlet side of said chamber, a flow limiting valve on the outlet side of said chamber, said flow limiting valve having a hollow stem and said first valve having a stem passing through said hollow stem, operating members connected to said stems, and means whereby said members are subjected to the gas pressures required to regulate the outlet pressure or to limit the flow of gas through the device as occasion requires.

9. In a combined pressure regulator and flow limiting device, a pressure regulating valve, an orifice plate on the outlet side of said valve and in series therewith, a flow limiting valve in series with said orifice and on the outlet side thereof, a diaphragm connected to said first valve and subject to the pressures of the gas on the inlet side of said first valve and on the outlet side of said orifice, and operating members connected to each of said valves including means responsive to the gas pressures whereby said valves are operated to regulate the pressure or to limit the flow of the gas as circumstances require.

10. In a combined pressure regulator and flow limiting device, a pressure regulating valve, an orifice plate on the outlet side of said valve and in series therewith, a demand limiting valve in series with said orifice and on the outlet side thereof, a diaphragm connected to said second valve and subject to the pressures of the gas on the inlet side of said orifice and the outlet side of said second valve, and an operating member connected to each of said valves including means responsive to gas pressures whereby said valves are operated to regulate the pressure or to limit the flow of the gas as circumstances require.

11. In a combined pressure regulator, volume meter and flow limiting device the combination of a fluid conducting casing, separate pressure regulating and flow limiting valves mounted in said casing in such a position that they remain in substantially balanced condition under the influence of the gas flowing in contact with them, valve seats in the casing arranged to cooperate with said valves, a volume meter connected with said casing, an orifice disk mounted in the casing in the path of flow of gas from the outlet of the said volume meter, said regulating valve, volume meter, orifice plate and limiting valve being arranged in the order named in the direction of the gas flow, flexible diaphragms mounted in the casing and positively connected with the regulating and limiting valves, said diaphragms being independently mounted and operable, means to impart the pressure on the outlet side of the orifice plate to one side and atmospheric pressure to the other side of the regulator diaphragm, and means to impart the pressures on the opposite sides of the orifice plate to the opposite sides of the limiting diaphragm.

12. In a combined pressure regulator, volume meter and flow limiting device, the combination of a pressure regulating valve, a volume meter, an orifice plate and a flow limiting valve all arranged in series in the order named in the course of the gas flow, and means whereby said flow limiting valve is controlled by the drop in pressure across said plate.

13. In a combined pressure regulator, volume meter and flow limiting device, the combination of a pressure regulating valve, volume meter, orifice plate and flow limiting valve, all arranged in series in the order named in the course of the gas flow, means whereby said regulating valve is controlled by the pressure of the gas following said plate acting against the atmosphere, and means whereby said flow limiting valve is controlled when in operation by the drop in pressure in the gas across said plate.

14. In a combined pressure regulator, volume meter and flow limiting device, the combination of means forming a central chamber, an orifice plate on the inlet side of said chamber, a pressure regulating valve on the inlet side of said orifice, a flow limiting valve on the outlet side of said chamber, a volume meter connected between said pressure regulating valve and said orifice plate, means whereby said regulating valve is controlled by the pressure of gas between said limiting valve and said plate acting against atmosphere, and means whereby said limiting valve is controlled when operating by a drop in pressure of the gas across the orifice plate.

15. In a combined pressure regulator, volume meter and flow limiting device, the combination of means forming a central chamber, a pressure regulating valve, an orifice plate on the inlet side of said chamber, a volume meter connected between said pressure regulating valve and said orifice plate, a flow limiting valve on the outlet side of said chamber, said flow limiting valve having a hollow stem and said first valve having a stem passing through said hollow stem, operating members connected to said stems, means whereby the operating member of said first valve is subjected to gaseous pressures required to regulate the outlet pressure when the rate of gas flow is below a certain predetermined limit, and means whereby the operating member of said limiting valve is subjected to a drop in the pressure of gas passing said orifice plate and whereby said limiting valve restricts the gas flow to a given maximum.

16. In a combined pressure regulator, volume meter and flow limiting device, the combination of an inlet chamber, a central chamber and an outlet chamber, all arranged in series in the course of the gas flow, a pressure regulating valve at the outlet side of said inlet chamber, an orifice plate at the inlet side of said central chamber, a volume meter connected between said pressure regulating valve and said orifice plate, a balancing diaphragm between said valve and said central chamber, a flow limiting valve between said central chamber and said outlet chamber, said flow limiting valve having a hollow stem passing through a portion of said outlet chamber, an operating diaphragm connected to said hollow stem and forming a division between two superimposed pressure chambers, a balancing diaphragm between said outlet chamber and the lower of said pressure chambers and connected to said hollow stem, an operating diaphragm between the upper of said pressure chambers and the atmosphere, a stem connecting said last mentioned diaphragm with said pressure regulating valve and extending through the hollow stem of said flow limiting valve, said hollow stem connecting said central chamber with the upper of said pressure chambers whereby said pressure regulating valve is governed by the pressure in said central chamber acting against atmosphere, and means whereby the operating diaphragm of said flow limiting valve is operated by a drop in pressure of the gas across the orifice plate.

In testimony whereof I affix my signature.

EARL S. RUSH.